No. 12,450. REISSUED FEB. 13, 1906.

O. L. PICKARD.

RIM FOR RUBBER TIRED WHEELS.

APPLICATION FILED NOV. 25, 1905.

Witnesses

Edwin L. Bradford

G. F. Ritter

Inventor

Orson L. Pickard

By Wm. C. Dyer

Attorney

UNITED STATES PATENT OFFICE.

ORSON L. PICKARD, OF TOLEDO, OHIO.

RIM FOR RUBBER-TIRED WHEELS.

No. 12,450. Specification of Reissued Letters Patent. Reissued Feb. 13, 1906.

Original No. 771,445, dated October 4, 1904. Application for reissue filed November 25, 1905. Serial No. 289,354.

*To all whom it may concern:*

Be it known that I, ORSON L. PICKARD, a citizen of the United States, residing at Toledo, in the county of Lucas and State of Ohio, have invented certain new and useful Improvements in Rims for Rubber-Tired Wheels; and I do hereby declare the following to be a full, clear, and exact description of the invention, such as will enable others skilled in the art to which it appertains to make and use the same.

This invention relates to rubber-tired vehicle-wheels, and more especially in connection with bicycles and automobiles, and has for its object to provide means for readily and conveniently securing the rubber tire in place on the rims without the use of cement or other adhesive composition.

Figure 1:
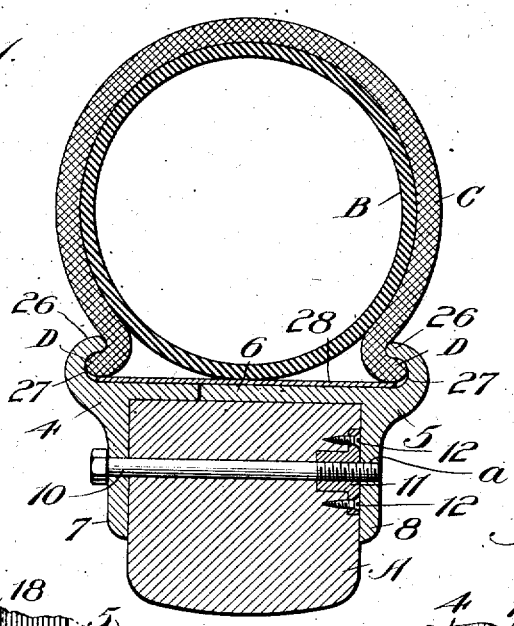
Figure 2:
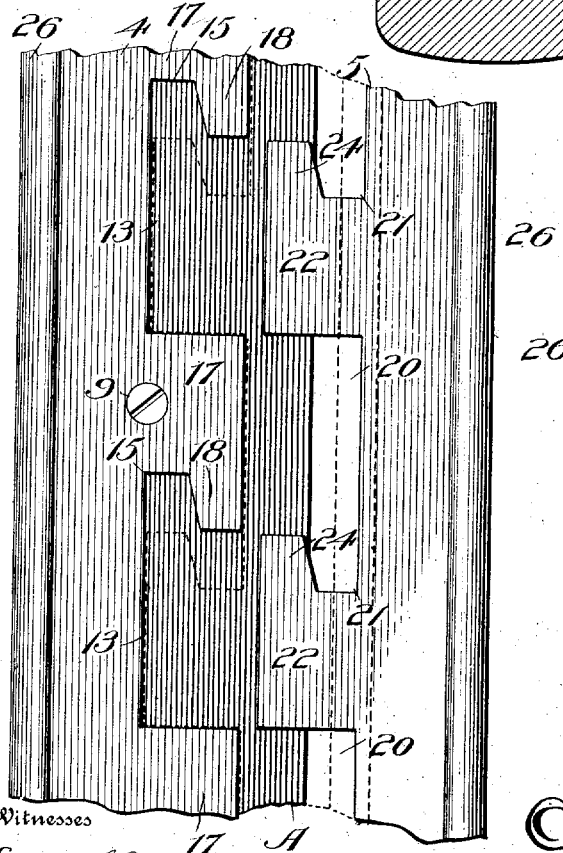
Figure 3:
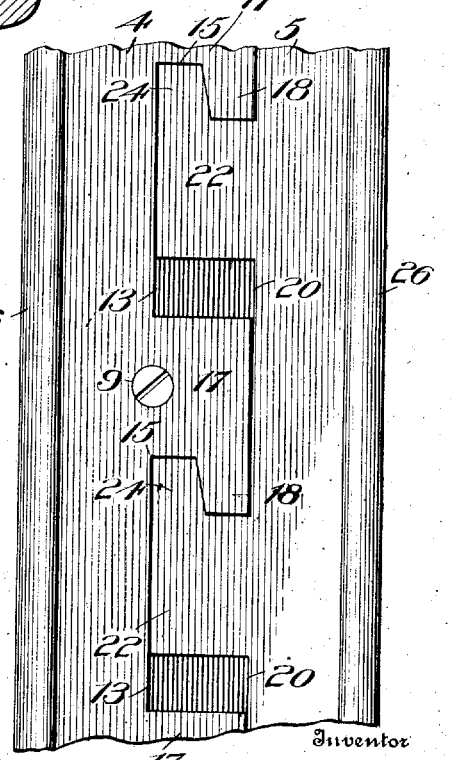

In the drawings, Figure 1 is a transverse section of the felly, rim, and tire parts embodying the improved features. Fig. 2 is a fragmentary plan view of a sectional rim, the two parts being disengaged; and Fig. 3 is a similar view showing the rim-sections locked together.

A represents the felly, which may be of the usual construction; B, the inner air-tube; C, the outer sheathing tube or tire; 4, the rigid section of the rim, and 5 the removable section. The rim is divided circumferentially through the body into the two sections or parts 4 and 5 and consists of the body 6 and the side flanges 7 and 8. The rigid section 4 is secured to the felly by a number of screws 9, inserted through the body part and disposed at intervals, the two sections of the rim being further secured to the felly by a number of locking-bolts 10, inserted through the rigid part of the rim and having a threaded engagement with the removable part, as at *a*. Socket-plates 11 are recessed in the felly on one side and fastened in place by screws 12, Fig. 1. The bolts 10 pass through and have a threaded engagement with the socket-plates, which afford additional holding-ground in properly securing these parts together against displacement.

The inner edge of the rigid rim part 4 is cut out at different points throughout its circumference in providing recesses 13, having locking-recesses 15 opening thereinto from the ends, as best shown in Fig. 2. This cutting-out feature provides an integral plate 17 between each two recesses 13, having a locking-tongue 18 and located intermediate with reference to the recesses 13. The outer wall, inclosing recesses 15, forms locking-tongues 18. The inner edge of removable rim part 5 is cut out to form recesses 20 and locking-recesses 21, corresponding to recesses 13 of the other rim part. The rim edge of the removable part is provided with plates 22, corresponding to plates 17, and is provided with locking-tongues 24, adapted to engage the recesses 15 in locking the rim-sections securely together against lateral separation, as shown in Fig. 3. The respective plates 17 22 are shown in position, Fig. 2, to enter the recesses in the separable rim-sections, and when so joined the loose rim part is turned to bring the locking-tongues into engagement, Fig. 3, with their locking-recesses, which brings the holes for the bolts 10 into line. The engaging edges of the tongues are beveled and come together with a wedging drawing action.

The side flanges 7 and 8 of the rim parts are curved inward around their upper sides and terminate in the overlapping hook edges 26, forming recesses 27 for a close-fitting engagement of the outwardly-turned edges D of the tire C in providing an interlock, as shown in Fig. 1.

A thin ring 28 is loosely interposed between the periphery of the rim and the air-tube and provides a smooth bearing-surface for the latter.

It will be readily seen by this arrangement with what facility the different parts may be assembled or separated and the pneumatic tube or tire so firmly secured in place that accidental displacement is impossible.

In separating the parts the bolts 10 are turned back just far enough to be free from a threaded engagement at *a* with the removable rim-section and yet have a threaded hold in socket-plates 11 and prevent the bolts from coming out.

The chief function of bolts 10 is that of readily locking the rim-sections 4 and 5 against independent rotation after they have first been firmly drawn together by engagement of their respective tongues 18 and 24, and it will be noted that this result is most readily accomplished by a single bolt, while at the same time several such bolts around the circumference of the structure are not objectionable.

Having thus described my invention, what I claim, and desire to secure by Letters Patent, is—

1. In a vehicle-wheel, a rim having a body portion divided circumferentially into two parallel abutting sections which interlock in the direction of rotation, and means for preventing independent rotation of said rim-sections, substantially as described.

2. In a vehicle-wheel, a rim having a body portion divided circumferentially into two sections provided respectively with recesses and engaging plates which interlock in the direction of rotation, and means for preventing independent rotation of said rim-sections, substantially as described.

3. In a vehicle-wheel, a rim having a body portion divided circumferentially into two parallel abutting sections which interlock in the direction of rotation, of opposing side tire-retaining flanges integral with said rim-sections, and means for preventing independent rotation of the rim-sections, substantially as described.

4. In a vehicle-wheel, a rim having a body portion divided circumferentially into two parallel abutting sections which interlock and are drawn together by relative rotation, and means for preventing independent rotation of said rim-sections, substantially as described.

5. In a vehicle-wheel, a rim having a body portion divided circumferentially into two parallel abutting sections which interlock and are drawn together by relative rotation, and a bolt for preventing independent rotation of said rim-sections, substantially as described.

6. In a vehicle-wheel, the combination with a felly, of a rim having a body portion divided circumferentially into two sections provided respectively with recesses and projecting plates which interlock and are drawn together by relative rotation, and a bolt for preventing independent rotation of said rim-sections, substantially as described.

7. In a vehicle-wheel, the combination with a felly, of a rim having a body portion divided circumferentially into two sections which interlock and are drawn together by relative rotation, side flanges upon said sections for embracing the felly, and a through-bolt for preventing independent rotation of said flanges and felly, substantially as described.

8. In a vehicle-wheel, the combination with a felly, of a rim divided circumferentially into two sections provided respectively with recesses and projecting plates which interlock in the direction of rotation said plates having inclined engaging surfaces for drawing said sections together, and means for preventing independent rotation of said rim-sections, substantially as described.

9. In a vehicle-wheel, the combination with a felly, of a rim divided circumferentially into two sections one fixed and the other removable with relation to the felly, coöperating recesses and projecting plates upon said rim-sections which interlock in the direction of rotation, a bolt for preventing independent rotation of said rim-sections and felly, and a socket-plate recessed into the felly and forming a bushing for the said locking-bolt, substantially as described.

10. In a vehicle-wheel, the combination with a felly and tire, of a rim divided circumferentially into two sections which interlock in the direction of rotation, a bolt for preventing independent rotation of said rim-sections, and a tire-protecting ring surrounding said rim-sections, substantially as described.

In testimony whereof I have signed my name to this specification in the presence of two subscribing witnesses.

ORSON L. PICKARD.

Witnesses:
ROBT. L. WATSON,
F. S. WATERBURY.